(12) United States Patent
Fujii

(10) Patent No.: US 6,424,602 B1
(45) Date of Patent: Jul. 23, 2002

(54) MAGNETO-OPTICAL REPRODUCING APPARATUS

(75) Inventor: Eiichi Fujii, Kamakura (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/467,180

(22) Filed: Dec. 20, 1999

(30) Foreign Application Priority Data

Dec. 21, 1998 (JP) .......................... 10-363120
Sep. 3, 1999 (JP) .......................... 11-250296
Dec. 14, 1999 (JP) .......................... 11-354559

(51) Int. Cl.$^7$ .......................... G11B 11/00
(52) U.S. Cl. .......................... 369/13.09
(58) Field of Search .......................... 369/13, 14, 110.01, 369/110.02, 112.01, 13.05, 13.02, 13.06, 13.09, 13.08; 360/59, 114; 365/122

(56) References Cited

U.S. PATENT DOCUMENTS

| | | | |
|---|---|---|---|
| 4,937,799 A | 6/1990 | Hashimoto et al. | |
| 5,132,945 A | 7/1992 | Osato et al. | |
| 5,353,266 A | 10/1994 | Fujii | |
| 5,636,187 A | 6/1997 | Fujii | |
| 5,656,384 A | 8/1997 | Nishimura et al. | |
| 5,810,979 A | 9/1998 | Nishimura et al. | |
| 5,818,811 A | 10/1998 | Fujii | |
| 5,936,915 A | 8/1999 | Fujii et al. | |
| 5,953,289 A | * 9/1999 | Miyaoka | 369/13 |
| 5,956,296 A | 9/1999 | Yamamoto et al. | |
| 5,995,472 A | 11/1999 | Fujii et al. | |
| 6,041,024 A | * 3/2000 | Ishii | 369/13 |
| 6,069,852 A | * 5/2000 | Miyaoka et al. | 369/13 |

FOREIGN PATENT DOCUMENTS

| JP | 6-195790 | * 7/1994 | 369/13 |
|---|---|---|---|
| JP | 6-290496 | 10/1994 | |

* cited by examiner

Primary Examiner—Tan Dinh
(74) Attorney, Agent, or Firm—Fitzpatrick, Cella, Harper & Scinto (57) ABSTRACT

Disclosed herein is a magneto-optical reproducing apparatus for reproducing information recorded on a magneto-optical medium comprising a substrate, and a first magnetic layer, a second magnetic layer and a third magnetic layer which are laminated on the substrate in that order, the first magnetic layer being a magnetic film relatively smaller in domain wall coercivity and greater in domain wall displaceability at a temperature close to ambient temperature compared with the third magnetic layer, and the second magnetic layer being a magnetic film having a Curie temperature lower than the first magnetic layer and the third magnetic layer, the apparatus comprising:

an optical system that the medium is irradiated with a light beam, domain walls of a magnetic domain for information formed on the medium being displaced by the irradiation of the light beam;

a photosensor for detecting a change in the polarization direction of reflected light of the light beam to output a reproduction signal;

a differentiating circuit for differentiating the reproduction signal outputted from the photosensor; and a binarizing circuit for generating a binary signal by comparing the signal differentiated in the differentiating circuit with a prescribed threshold value.

10 Claims, 9 Drawing Sheets

MAGNETO-OPTICAL REPRODUCING APPARATUS

BACKGROUND OF THE INVENTION

1. Field of the Invention

The present invention relates to a magneto-optical reproducing apparatus for reproducing information recorded on a magneto-optical medium utilizing a magneto-optical effect, and particularly to a magneto-optical reproducing apparatus for reproducing the information using a reproducing method by domain wall replacement.

2. Related Background Art

As a rewritable high-density recording medium, attention has heretofore been paid to a magneto-optical medium in which magnetic domains are formed in a magnetic thin layer thereof using thermal energy of a semiconductor laser to record information, and this information is read out by utilizing a magneto-optical effect. In recent years, there has been a strong demand for further enhancing the recording density of this magneto-optical medium to provide it as a recording medium having a greater capacity. The linear recording density of an optical disk such as the magneto-optical medium greatly depends on the laser wavelength and the numerical aperture of an objective lens of an optical system for reproduction. More specifically, since the laser wavelength $\lambda$ and the numerical aperture NA of the objective lens of the optical system for reproduction decide the diameter of a beam waist, the detectable range of the spatial frequency upon reproduction of signals is limited to about 2 NA/$\lambda$.

Therefore, for actually achieving higher recording density with a conventional recording medium, it is necessary to shorten the laser wavelength $\lambda$ or enlarge the numerical aperture NA of the objective lens in the optical system for reproduction. However, the improvements in the laser wavelength $\lambda$ and the numerical aperture NA of the objective lens are limited naturally. Therefore, techniques that the structure and reading method of a recording medium are devises to improve the recording density have been developed. For example, Japanese Patent Application Laid-Open No. 6-290496 proposes a method for reproducing high-density record signals by displacing a domain wall present at a boundary between record marks utilizing a temperature gradient, and detecting this domain wall displacement. According to this method, the domain wall is displaced just at the time the domain wall has been heated to a temperature at which the domain wall is displaced, and the high-density record signals are reproduced by detecting this domain wall displacement, so that the signals can be reproduced without depending on the optical diffraction limit at all. In addition, since no waveform interference occurred even when high-density record signals are reproduced, complicated processings such as waveform equalization is unnecessary, and so the reproduction of information can be performed by a simple signal processing circuit.

On the other hand, when a track pitch is narrowed in order to enhancing a track density in the conventional recording media, crosstalk from adjacent tracks is overlapped on reproduction signals. Even the use of the above-described reproducing method described in Japanese Patent Application Laid-Open No. 6-290496 has involved a problem that crosstalk is also overlapped on reproduction signals when a track pitch is narrowed, and so information cannot be exactly reproduced.

SUMMARY OF THE INVENTION

It is an object of the present invention to provide a magneto-optical reproducing apparatus by which the above-described problems involved in the prior art, and higher-density information can be reproduced by not only enhancing a linear recording density, but also enhancing a track density.

The above object can be achieved by the present invention described below.

According to the present invention, there is thus provided a magneto-optical reproducing apparatus for reproducing information recorded on a magneto-optical medium comprising a transparent substrate, a first magnetic layer, a second magnetic layer and a third magnetic layer which layers are laminated on the substrate in that order, the first magnetic layer comprising a magnetic film relatively smaller in domain wall coercivity and greater in domain wall displaceability at ambient temperature and temperature close to ambient temperature compared with the third magnetic layer, and the second magnetic layer comprising a magnetic film having a Curie temperature lower than the first magnetic layer and the third magnetic layer, the apparatus comprising:

an optical system for irradiating the medium with a light beam, domain walls of a magnetic domain for information formed on the medium being displaced by the irradiation with the light beam;

a photosensor for detecting a change in a polarization direction of reflected light of the light beam to output a reproduction signal;

a differentiating circuit for differentiating the reproduction signal outputted from the photosensor; and a binarizing circuit for generating a binary signal by comparing the signal differentiated in the differentiating circuit with a prescribed threshold value.

According to the present invention, there is also provided a magneto-optical reproducing apparatus for reproducing information recorded on a magneto-optical medium comprising a transparent substrate, a first magnetic layer, a second magnetic layer and a third magnetic layer which layers are laminated on the substrate in that order, the first magnetic layer comprising a magnetic film relatively smaller in domain wall coercivity and greater in domain wall displaceability at ambient temperature and temperature close to ambient temperature compared with the third magnetic layer, and the second magnetic layer comprising a magnetic film having a Curie temperature lower than the first magnetic layer and the third magnetic layer, the apparatus comprising:

an optical system for irradiating the medium with a light beam, domain walls of a magnetic domain for information formed on the medium being displaced by the irradiation with the light beam;

a photosensor for detecting a change in a polarization direction of reflected light of the light beam to output a reproduction signal;

a first differentiating circuit for differentiating the reproduction signal outputted from the photosensor to generate a primary differential signal;

a second differentiating circuit for differentiating the primary differential signal to generate a secondary differential signal; and a binarizing circuit for generating a binary signal by comparing the secondary differential signal generated in the second differentiating circuit with a prescribed threshold value.

DESCRIPTION OF THE PREFERRED EMBODIMENTS

The embodiments of the present invention will hereinafter be described in detail with reference to the accompanying drawings. The magneto-optical reproducing apparatus according to the present invention reproduce information recorded on a magneto-optical medium using the reproducing method utilizing domain wall displacement disclosed in Japanese Patent Application Laid-Open No. 6-290496. The principle of the reproducing method utilizing domain wall displacement will therefore be described on the basis of FIGS. 1A to 1C and FIGS. 2A and 2B before the embodiments of the present invention are described.

Figure 1A:
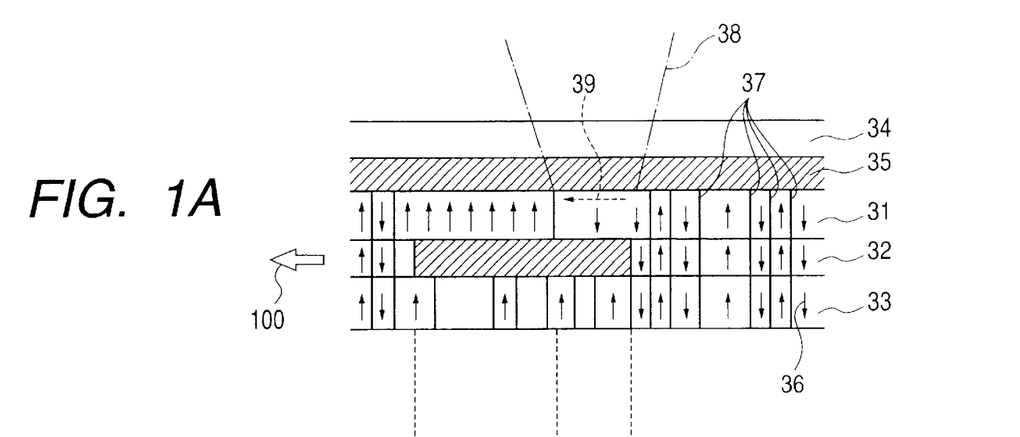
FIGS. 1A, 1B and 1C illustrate the principle of the reproducing method utilizing domain wall displacement used in the present invention.

FIG. 1A is a schematic cross-sectional view illustrating an exemplary magneto-optical medium used in the reproducing method utilizing domain wall displacement. According to this recording medium, a light-transmitting layer 35, a first magnetic layer 31, a second magnetic layer 32 and a third magnetic layer 33 are laminated in that order on a transparent substrate 34. In this case, the description is given on a case where the magnetic layer of the recording medium has a three-layer structure. Arrows 36 in the respective layers indicate directions of atomic spins. A domain wall 37 is formed at the boundary between regions in which the directions of spins are opposite to each other.

First magnetic layer 31 is formed of a magnetic film relatively smaller in domain wall coercivity and greater in domain wall displaceability at a temperature close to ambient temperature compared with third magnetic layer 33. On the other hand, second magnetic layer 32 is formed of a magnetic film having a Curie temperature lower than first magnetic layer 31 and third magnetic layer 33. First magnetic layer 31 has small vertical magnetization anisotropy compared with third magnetic layer 33.

As transparent substrate 34, there may be used, for example, polycarbonate or glass. As light-transmitting layer 35, there may be used, for example, a transparent dielectric material such as $Si_3N_4$, AlN, $SiO_2$, SiO, ZnS or $MgF_2$. A protective layer may also be formed on the reverse side of third magnetic layer 33 to substrate 34. As a material of the protective layer, there may be used the same material as in light-transmitting layer 35. These respective layers are formed on the substrate by, for example, continuous sputtering by a magnetron sputtering system, or continuous vapor deposition. In particular, the magnetic layers are exchange-coupled to one other by continuously forming the films under vacuum.

In addition, a metal layer formed of Al, AlTa, AlTi, AlCr, Cu or the like may be added into this layer structure to control thermal properties, or a protective coating formed of a resin may be applied. Alternatively, substrates, on which the respective layers have been formed, may be stuck to each other.

In the above-described medium, it is considered that magnetic layers 31 to 33 are constructed with various magnetic materials. For example, they may be formed by rare earth-iron group amorphous alloys comprising 10 to 40 atom % of at least one of rare earth elements such as Pr, Nd, Sm, Gd, Tb, Dy and Ho, and 90 to 60 atom % of at least one of elements of the iron group such as Fe, Co and Ni. In order to improve corrosion resistance and the like, elements such as Cr, Mn, Cu, Ti, Al, Si, Pt and/or In may be added in a small amount.

In the case of heavy rare earth-iron group amorphous alloys, saturation magnetization can be controlled by a compositional ratio of the rare earth elements to the elements of the iron group. The Curie temperature may also be controlled by the compositional ratio. However, in order to control the Curie temperature independently of the saturation magnetization, a method of using, as the element of the iron group, a material obtained by replacing a part of Fe by Co to control the amount replaced can be preferably utilized. More specifically, since rise in the Curie temperature of about 6° C. can be expected by replacing 1 atom % of Fe by Co, the amount of Co added is adjusted using this relation so as to give the desired Curie temperature. To the contrary, it is possible to lower the Curie temperature by adding a small amount of a non-magnetic element such as Cr and Ti. The Curie temperature may also be controlled by using at least two rare earth elements to adjust the compositional ratio.

Besides the above materials, materials such as garnet, platinum group-iron group periodic structure films and platinum group-iron group alloys may be used.

For first magnetic layer 31, it is desirable to use a rare earth-iron group amorphous alloy such as GdCo, GdFeCo, GdFe or NdGdFeCo, which has small vertical magnetization anisotropy, or a material for bubble memory, such as garnet.

For third magnetic layer 33, it is desirable to use a material having great vertical magnetization anisotropy and being capable of stably holding the magnetized state, for example, a rare earth-iron group amorphous alloy such as TbFeCo, DyFeCo or TbDyFeCo, or a platinum group-iron group periodic structure film such as Pt/Co or Pd/Co.

The recording of data signals in the above-described magneto-optical medium is conducted by modulating an external magnetic field while irradiating the medium with a laser beam of such power that third magnetic layer 33 is heated to a temperature above the Curie temperature in a state that the medium is being moved (in the direction of an arrow 100 in FIG. 1A), or modulating the power of the laser beam while applying a magnetic field of a fixed direction. In the case of the latter, when the intensity of the laser beam is adjusted in such a manner that only a predetermined region within a light spot comes near to the Curie temperature of the third magnetic layer, a record magnetic domain smaller than the size of the light spot can be formed, so that a signal of frequency less than optical diffraction limit can be recorded.

In the above-described magneto-optical medium, a plurality of information tracks are formed side by side. However, it is desirable that the exchange-coupling (magnetic coupling) between the magnetic layers on these information tracks be almost broken so as to smoothly displace a domain wall in the first magnetic layer. Such a construction will hereinafter be described.

Figure 2A:
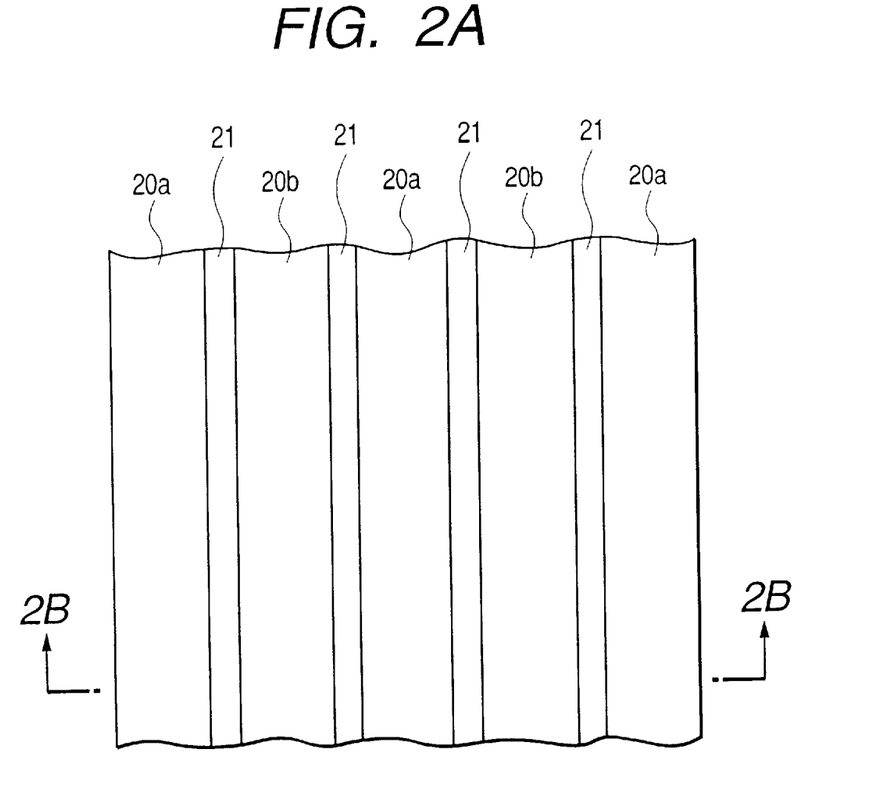
FIGS. 2A and 2B are schematic views illustrating an exemplary construction of a magneto-optical medium used in the present invention.
Figure 2B:
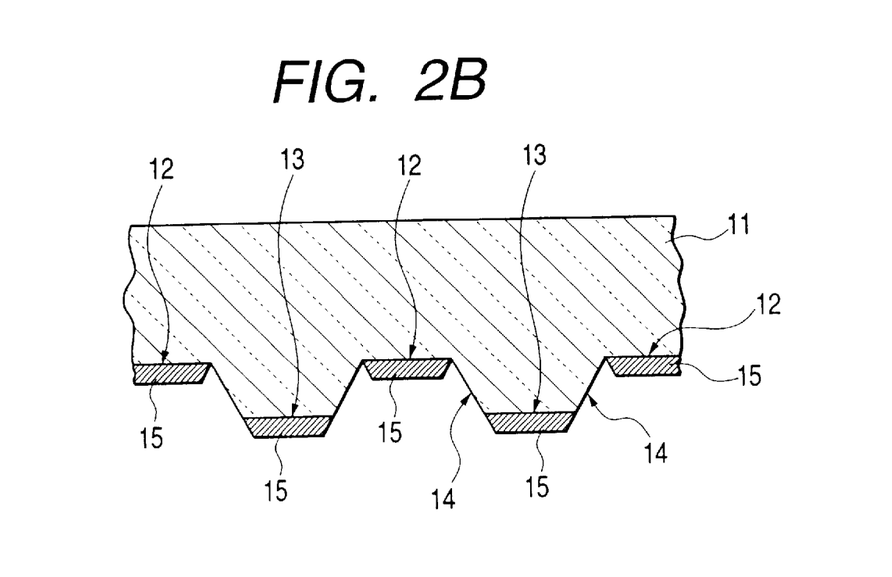

FIG. 2A is a schematic a plan view of a magneto-optical medium used in the present invention, and FIG. 2B is a schematic cross-sectional view taken on line 2B—2B in FIG. 2A, i.e., a schematic cross-sectional view in a direction perpendicular to the longitudinal direction of an information track. In FIG. 2A, reference characters 20a and 20b both designate information tracks. As illustrated in FIG. 2B, a plurality of stripe-like grooves 12 are formed in a transparent substrate 11, and a land 13 is provided between these grooves 12. The information tracks are respectively formed by these grooves 12 and lands 13. More specifically, a plurality of information tracks 20a formed from the grooves, and a plurality of information tracks 20b formed from the lands are alternately arranged.

A slanting part 14 is formed between groove 12 and land 13. Slanting part 14 constitutes a separating strip 21 between information track 20a and information track 20b. On each of grooves 12 and lands 13, is formed the above-described magnetic multi-layer film 15 comprising first, second and third magnetic layers 31, 32 and 33. However, no magnetic multi-layer film 15 is formed on slanting part 14, so that the magnetic multi-layer film 15 is broken off between groove 12 and land 13 and becomes discontinued. By such a construction, exchange-coupling (magnetic coupling) between respective information tracks 20a and 20b is broken.

In the above-described example, magnetic multia-layer film 15 is not formed on slanting parts 14 at all. Even when a very thin magnetic multi-layer film 15 is formed on slanting parts 14, however, no exchange-coupling acts between the information tracks because the magnetic coupling at these parts is almost negligible. A laser beam of high power may be struck on only such a magnetic multi-layer film 15 formed on each slanting part 14 to modify the magnetic multi-layer film at this portion into an in-plane magnetization film or the like, thereby braking off the exchange-coupling between the information tracks. In the present invention, such various states as described above are generally referred to as a state that exchange-coupling (magnetic coupling) between information tracks is broken off.

The principle of displacing a domain wall using such a magneto-optical medium as described above to reproduce information will hereinafter be described.

Figure 1B:
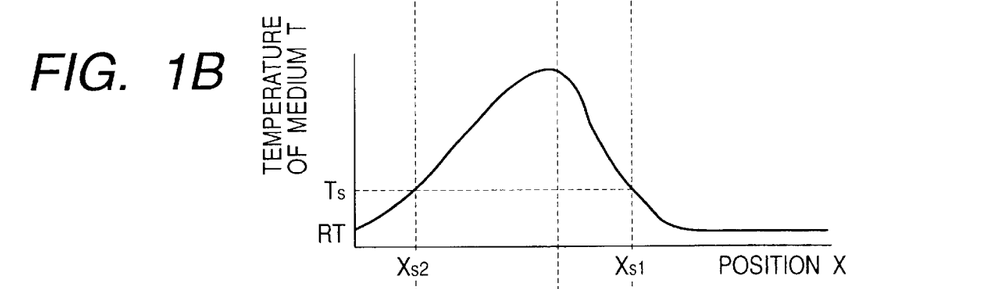

FIG. 1B diagrammatically illustrates the distribution of a temperature T on a magneto-optical medium versus the position X of the medium. This temperature distribution is induced on the medium by a light beam spot 38 for reproduction and optional other auxiliary heating means. In this drawing, at the positions $X_{S1}$ and $X_{S2}$ the temperature of the medium is raised to a temperature $T_S$ close to the Curie temperature of second magnetic layer 32, at which the exchange-coupling between first magnetic layer 31 and third magnetic layer 33 is broken. Namely, no exchange-coupling force act between first magnetic layer 31 and third magnetic layer 33 from position $X_{S1}$ to position $X_{S2}$.

Figure 1C:
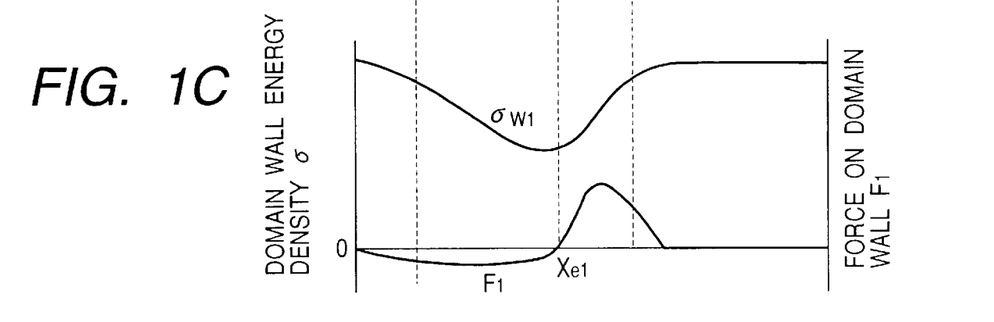

FIG. 1C diagrammatically illustrates the distribution of domain wall energy density $\sigma_{W1}$ of first magnetic layer 31 corresponding to the temperature distribution in FIG. 1B. When a gradient of the domain wall energy density $\sigma_{w1}$ exists in a direction of X, force $F_1$ determined by the following equation acts on domain walls of first magnetic layer 31 existing at a position X.

$$F_1 = \partial \sigma_{W1}/\partial X$$

This force $F_1$ acts so as to displace the domain walls to a position at which the domain wall energy is lower. On the other hand, force $F_S$ also acts on the domain walls so as not to displace the domain walls. The force $F_S$ is given by the following equation $$F_S = 2\pi \times M_{S1} \times H_{W1}$$

wherein $M_{S1}$ is the saturation magnetization of first magnetic layer 31, and $H_{W1}$ is the domain wall coercive force of first magnetic layer 31.

If this $F_S$ is sufficiently small when the temperature of the recording medium is above $T_S$, the domain wall is easily displaced by the force $F_1$. On the other hand, in regions on this side of $X_{S1}$ (right-hand side in FIG. 1B) and on the back side of the position $X_{S2}$, the temperature of the medium is lower than $T_S$, and first magnetic layer 31 is exchange-coupled with third magnetic layer 33 great in domain wall coercive force, so that the domain wall in first magnetic layer 31 is also fixed at a position corresponding to the position of the domain wall in third magnetic layer 33 and is scarcely displaced.

In the reproducing method utilizing domain wall displacement, when a domain wall 37 is at a position $X_{S1}$ of the medium as illustrated in FIGS. 1A to 1C, and the temperature of the medium is raised to a temperature $T_S$ close to the Curie temperature of second magnetic layer 32, an d so the exchange-coupling between first magnetic layer 31 and third magnetic layer 33 is broken , the domain wall 37 in first magnetic layer 31 is displaced at "high speed" to a region Xe1 in which the temperature is higher and the domain wall energy density is lower, as indicated by a broken arrow 39. More specifically, a record mark is enlarged at high speed in a light beam spot for reproduction at just the time that an edge of a mark recorded by reversal of magnetization on the recording medium comes to the position $X_{S1}$ with the movement of the medium. As a result, a steep reproduction signal short in rise time and fall time can be provided.

According to the reproducing method utilizing domain wall displacement, as described above, a reproduction signal steeper than the conventional magneto-optical reproducing method can be provided. The present invention pays attention to this point to reproduce signals without being affected by crosstalk of reproduction signals from adjacent tracks. The embodiments of the present invention will hereinafter be described taking into account the above-described way of thinking.

Figure 3:
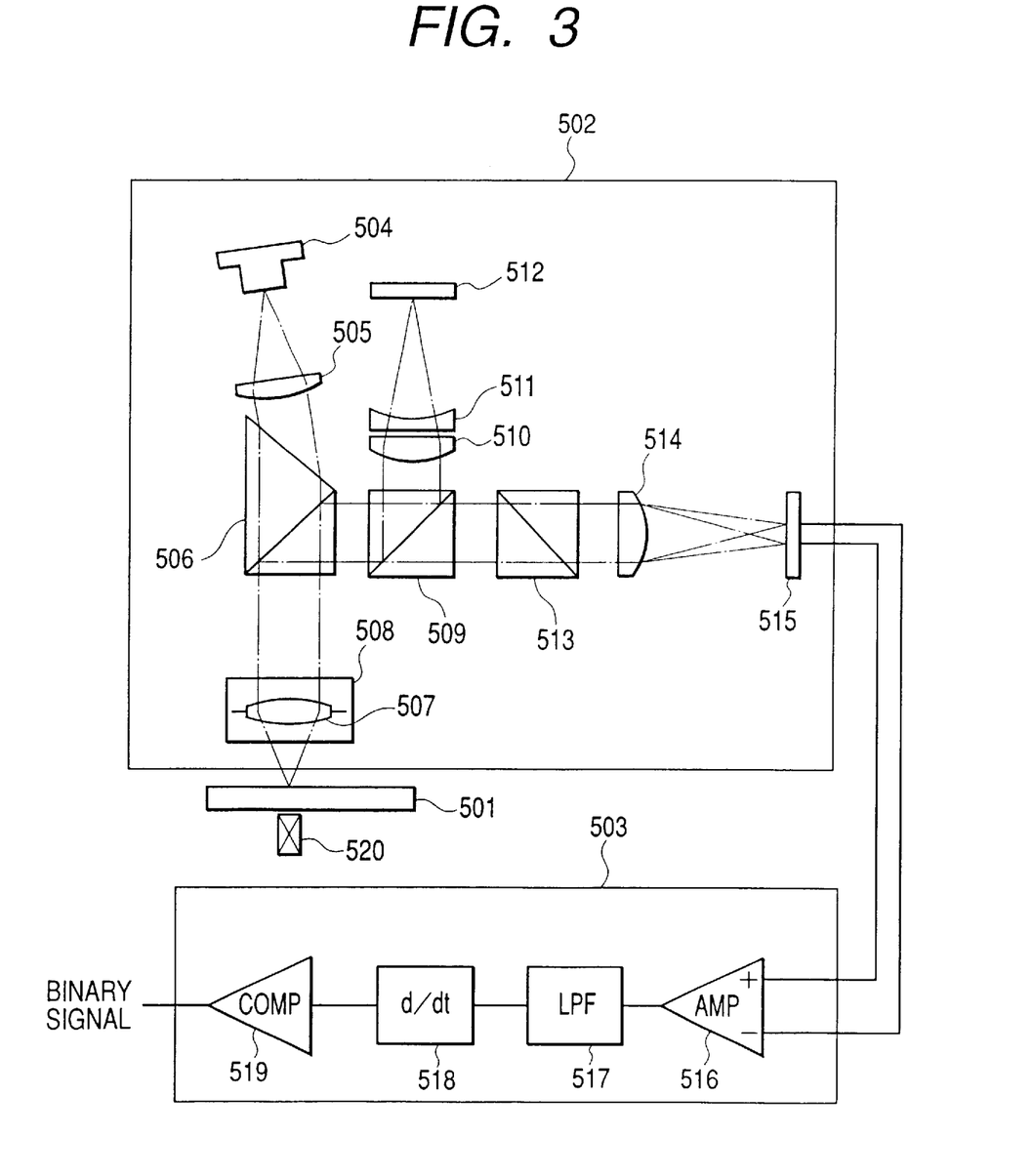
FIG. 3 is a block diagram illustrating the construction of a magneto-optical reproducing apparatus according to a first embodiment of the present invention.

FIG. 3 is a block diagram illustrating the construction of a magneto-optical reproducing apparatus according to a first embodiment of the present invention. In FIG. 3, a magneto-optical disk 501 is a magneto-optical medium in which information is reproduced by an interaction between light and magnetism. This recording medium is constructed as a magneto-optical disk having a disk-like shape and rotates on its axis according to drive of a spindle motor (not illustrated). The structure of magneto-optical disk 501 is the same as that described in FIG. 1A and FIGS. 2A and 2B. More specifically, it can be applied to the reproducing method utilizing domain wall displacement described in Japanese Patent Application Laid-Open No. 6-290496 and comprises a substrate, and first, second and third magnetic layers which are laminated in that order on the substrate and exchange-coupled to one other at room temperature. The first magnetic layer comprises a magnetic film relatively smaller in domain wall coercive force and greater in domain wall displaceability at a temperature close to ambient temperature compared with the third magnetic layer. The second magnetic layer comprises a magnetic film having a Curie temperature lower than the first and third magnetic layers.

On the substrate side of magneto-optical disk 501, is arranged an optical pickup 502 containing optical devices such as a light source, various lenses and a photosensor therein. Optical pickup 502 is adapted to irradiate magneto-optical disk 501 with a light beam for reproduction to detect reflected light thereof. The construction of optical pickup 502 will be described. Reference numeral 504 indicates a source of a laser beam for recording and reproduction, the wavelength of which is 680 nm. The light source 504 is arranged in such a manner that P polarized light is incident on the recording medium. Reference numeral 505 designates a collimator lens. Reference numeral 506 indicates a beam splitter equipped with a beam-shaping part, which is designed to transmit 70 to 80% of P polarized light and completely reflect S polarized light. Reference numeral 507 designates an objective lens designed according to the wavelength of the laser beam from light source 504 for recording and reproduction. The NA thereof is 0.55.

Objective lens 507 is driven by a serve actuator 508 to conduct tracking control and focusing control in such a manner that the laser beam for record reproduction is focused on an information track of magneto-optical disk 501 by displacing objective lens 507 in both focusing and tracking directions by a servo control circuit (not illustrated) and is scanned following the information track. Reference numeral 509 indicates a beam splitter for distributing reflected light from magneto-optical disk 501 to an RF sensor 515 for detecting an information signal and a servo sensor 512 for detecting a tracking error signal and a focusing error signal. Reference numeral 510 indicates a convex lens. Reference numeral 511 indicates a cylindrical lens. In the servo control circuit, a focusing error signal and tracking error signal are generated based on signals outputted from the serve sensor, and focusing control and tracking control are made based on the respective error signals thus obtained.

Reference numeral 513 indicates a birefringence crystal for separating polarized light components of ±45° to the incident light to differentially detect the reflected light from magneto-optical disk 501. The reflected light from magneto-optical disk 501 is detected in RF sensor 515 through beam splitters 506, 509, birefringence crystal 513 and a convex lens 514. In order to enhance an SN ratio of the reproduction signal, a differential optical system is used in optical pickup 502, and RF sensor 515 is constructed as a two-piece sensor. A light signal received into the two-piece sensor is differentially detected by an amplifier in a signal reproducing circuit 503, thereby generating a reproduction signal. A magnetic field-applying device 520 is arranged at a position opposite to optical pickup 502 with interposition of magneto-optical disk 501. Magnetic field-applying device 520 generates a modulated magnetic field upon information recording so as to apply it to magneto-optical disk 501. An analog signal generated in optical pickup 502 is sent to signal reproducing circuit 503 equipped with a differentiating circuit to produce reproduction data free of influence of crosstalk from adjacent tracks, which will be described subsequently in detail.

Signal reproducing circuit 503 will hereinafter be described in detail. RF sensor 515 within optical pickup 502 comprises a two-piece sensor as described above and detects reflected light from magneto-optical disk 501 to output an analog signal corresponding to a change in the polarization direction thereof. An amplifier 516 differentially detects an output signal from the two-piece photosensor of RF sensor 515 and outputs it as a reproduction signal. A low-pass filter 517 is a filter for attenuating high-frequency noises unnecessary for reproduction of the reproduction signal from amplifier 516. A differentiating circuit 518 is a circuit for time differentiating the reproduction signal. Reference numeral 519 indicates a hysteresis comparator having different comparative levels to leading edge and trailing edge. These two comparative levels can be modulated independently of each other. Cut-off frequency of low-pass filter 517 is desirably preset to from 1.5 times to 4 times as much as the highest frequency contained in the reproduction signal. It is more desirable to preset it to from 2 times to 3 times.

Figure 4A:
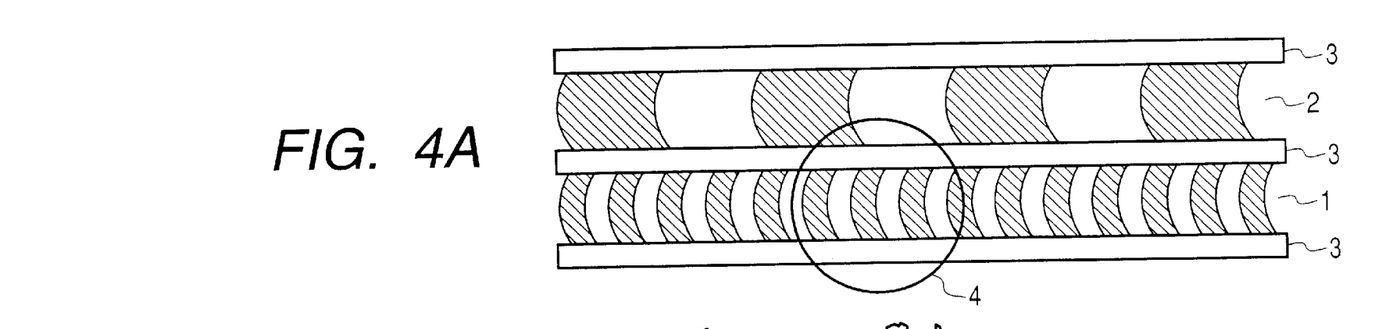
FIGS. 4A, 4B, 4C and 4D illustrate information reproducing operation according to the first embodiment of the present invention.

The operation of information reproduction according to this embodiment will hereinafter be described in detail with reference to FIGS. 4A to 4D. FIG. 4A illustrates a part of magneto-optical disk 501 on an enlarged scale. In FIG. 4A, a light beam spot 4 for record reproduction from light source 504 for recording and reproduction is scanned on an information track 1 to reproduce information recorded on information track 1. Reference numeral 2 indicates an adjacent information track, and 3 a separating strip for separating information tracks from each other. When information is reproduced while irradiating the information track 1 with a light beam spot for reproduction as illustrated in FIG. 4A, in a state that the medium is being moved (magneto-optical disk 501 is being rotated on its axis), the temperature of the recording medium is raised at information track 1 to a sufficient temperature to conduct domain wall displacement-reproduction by the irradiation of light beam spot 4 for reproduction. Therefore, a steep reproduction signal according to such reproducing method utilizing domain wall displacement as illustrated in FIGS. 1A to 1C is provided from information track 1.

Figure 4B:
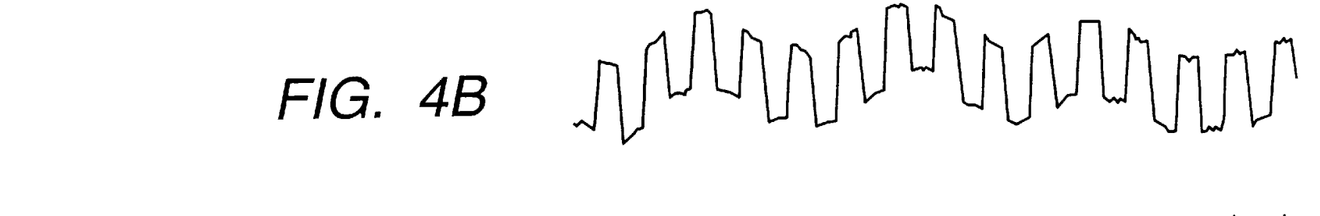

At this time, when a track pitch is narrower than the size of light beam spot 4 for reproduction as illustrated in FIG. 4A, light beam spot 4 for reproduction is also struck on an adjacent information track 2. Therefore, a signal component from the adjacent information track 2 is mixed in the reproduction signal from information track 1. In this case, however, light beam spot 4 for reproduction is struck on the center of information track 1, and so the temperature of the medium is not raised at adjacent information track 2 to a sufficient temperature to conduct domain wall displacement. Therefore, the reproduction signal from adjacent information track becomes identical with the reproduction signal according to the conventional magneto-optical reproducing method, and does not become a steep reproduction signal according to the reproducing method utilizing domain wall displacement. Accordingly, the reproduction signal reproduced by light beam spot 4 for reproduction becomes a mixture of the steep reproduction signal according to the reproducing method utilizing domain wall displacement from information track 1 and the gentle reproduction signal according to the conventional magneto-optical reproducing method from adjacent information track 2 as illustrated in FIG. 4B. The reproduction signal in FIG. 4B is a signal outputted from amplifier 516.

Figure 4C:
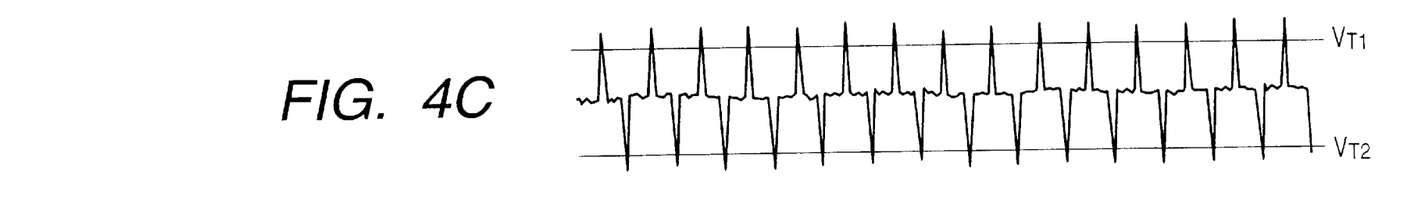

As described above, a proportion of the reproduction signal from the adjacent information track is increased when the track pitch of information tracks is narrowed to enhance the recording density of the magneto-optical medium. Therefore, a component like low-frequency wave is contained in the reproduction signal as illustrated in FIG. B. The reproduction signal outputted from amplifier 516 is fed to differentiating circuit 518 after a high-frequency component is removed through low-pass filter 517, and time differentiated in differentiating circuit 518. FIG. 4C illustrates a signal outputted from differentiating circuit 518. When the reproduction signal is differentiated in differentiating circuit 518 as described above, a signal in which only the steep reproduction signal according to the reproducing method utilizing domain wall displacement is stressed is provided as illustrated in FIG. 4C. Namely, a crosstalk component from adjacent information track 2 can be removed to extract a signal component only from the intended information track 1.

Figure 4D:
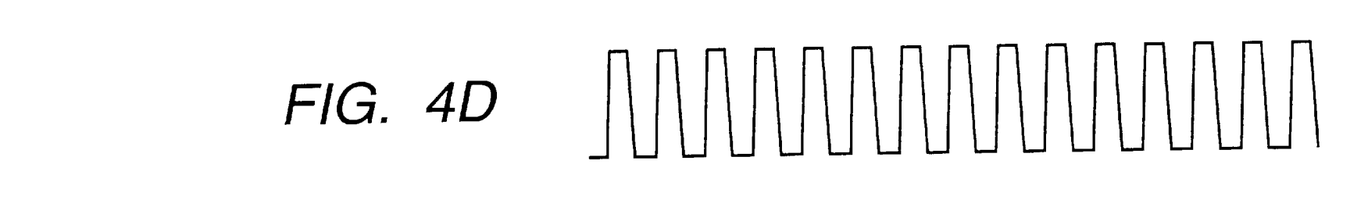

The differential signal outputted from differentiating circuit 518 is compared with comparative levels $V_{T1}$ and $V_{T2}$ as illustrated in FIG. 4C to generate a binary signal as illustrated in FIG. 4D. Comparative level $V_{T1}$ corresponds to a leading edge of the differential signal, while $V_{T2}$ corresponds to a trailing edge. Edges of an information magnetic domain recorded on the information track are detected in such a manner, and the binary signal is used to conduct prescribed signal processing such as demodulation, whereby reproduction data is reproduced. In this embodiment, the reproduction signal obtained from magneto-optical disk 501 is time differentiated to generate a signal in which only the steep reproduction signal according to the reproducing method utilizing domain wall displacement is stressed, and a binary signal is generated from the differential signal, so that the influence of crosstalk from the adjacent track can be eliminated even in a recording medium that the track pitch is narrow, and crosstalk from adjacent tracks is contained to a great extent, thereby exactly reproducing information.

Figure 5A:
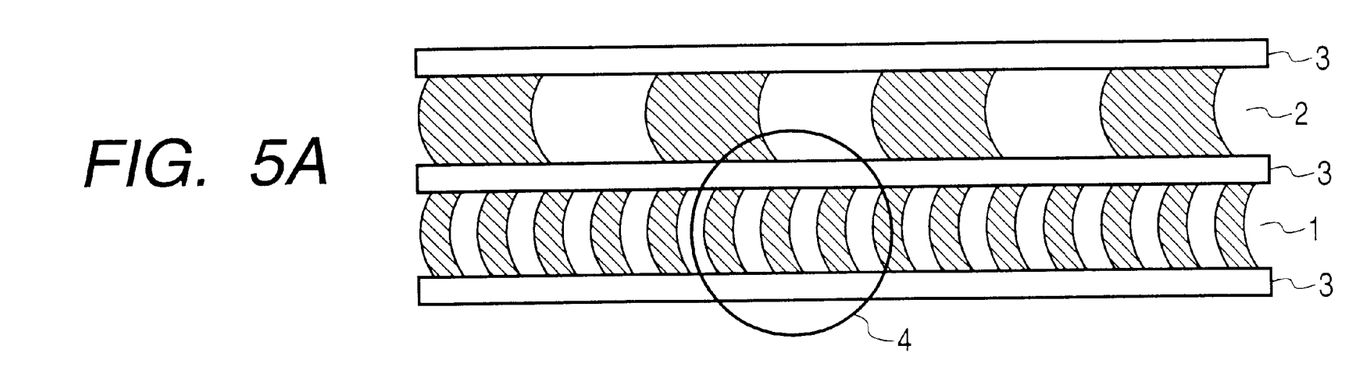
FIGS. 5A, 5B and 5C illustrate information reproducing operation by the conventional magneto-optical reproducing apparatus.
Figure 5B:
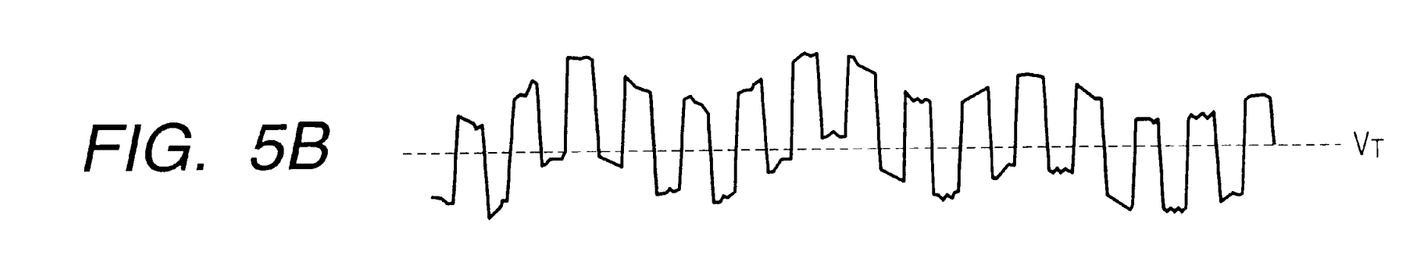
Figure 5C:
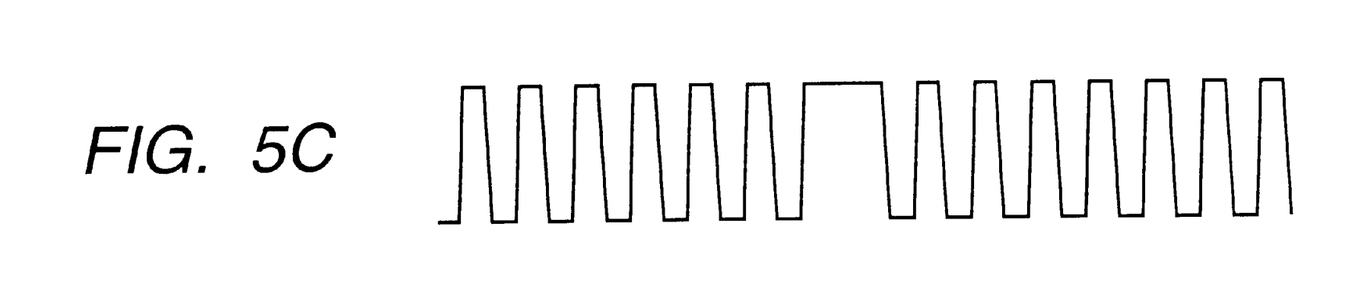

For the sake of comparison, the operation of reproduction according to the conventional apparatus will hereinafter be described with reference to FIGS. 5A to 5C. FIG. 5A illustrates information tracks of a magneto-optical disk on an enlarged scale like FIG. 4A. The same reference numerals as those in FIG. 4A indicate like parts. A light beam spot 4 for reproduction is scanned on an information track 1 to reproduce information recorded on information track 1. At this time, a track pitch is narrower than the size of light beam spot 4 for reproduction. FIG. 5B illustrates a reproduction signal reproduced from reflected light from the magneto-optical medium by the light beam spot for reproduction. In the conventional apparatus, this reproduction signal is compared with a comparative level $V_T$ by a comparator to give such a binary signal as illustrated in FIG. 5C. In the conventional apparatus, the reproduction signal is binarized as it contains crosstalk from an adjacent information track as illustrated in FIG. 5B, so that the binary signal is affected by the crosstalk as illustrated in FIG. 5C, whereby information cannot be exactly reproduced.

Figure 6:
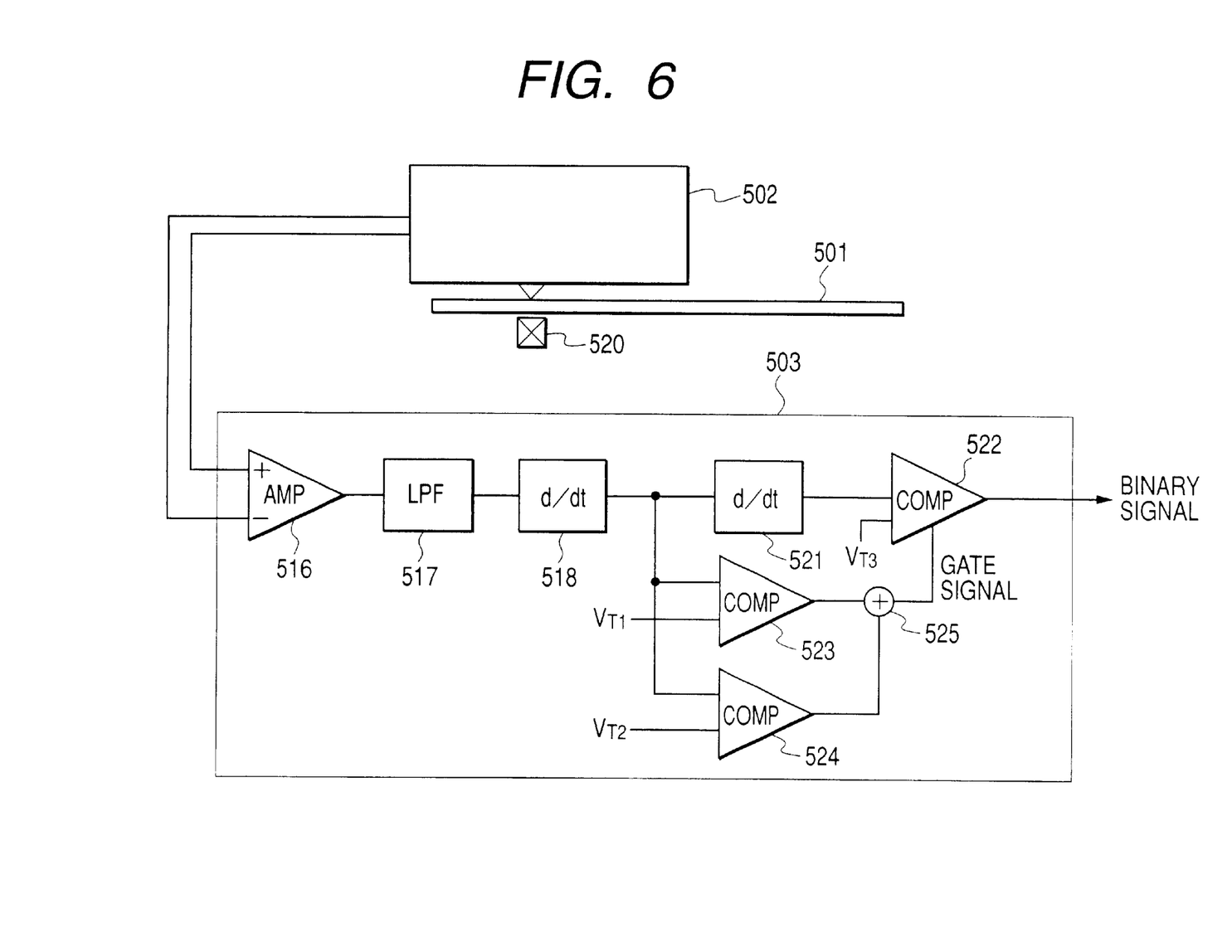
FIG. 6 is a block diagram illustrating the construction of a magneto-optical reproducing apparatus according to a second embodiment of the present invention.

A second embodiment of the present invention will hereinafter be described. FIG. 6 is a block diagram illustrating the construction of a magneto-optical reproducing apparatus according to the first embodiment of the present invention. In FIG. 6, reference numeral 501 indicates a magneto-optical disk, 502 an optical pickup, and 520 a recording magnetic field-applying device. These components are all the same as those in FIG. 3. Incidentally, in FIG. 6, the interior construction of optical pickup 502 is omitted. However, it is the same as in optical pickup 502 illustrated in FIG. 3. Reference numeral 503 designates a signal reproducing circuit.

In signal reproducing circuit 503, are provided an amplifier 516 for differentially detecting an output signal from RF sensor 515 within optical pickup 502 and outputting a reproduction signal corresponding to a change in the polarization direction of reflected light from the medium, a low-pass filter 517 for attenuating high-frequency noises unnecessary for reproduction of the reproduction signal from amplifier 516 and a differentiating circuit 518 for differentiating a signal outputted from low-pass filter 517. In this embodiment, a differentiating circuit 521 for further differentiating a signal outputted from the differentiating circuit 518 to generate a secondary differential signal is provided. A signal outputted from differentiating circuit 521 is compared with a prescribed threshold value $V_{T3}$ (O level) by a comparator 522 to detect a zero-cross point of the secondary differential signal, thereby generating a binary signal.

In a comparator 523, a gate signal is generated by comparing a primary signal outputted from differentiating circuit 518 with a prescribed threshold value $V_{T1}$, thereby generating a gate signal. In a comparator 524, a gate signal is generated by comparing the primary signal outputted from differentiating circuit 518 with a prescribed threshold value $V_{T2}$, thereby generating a gate signal. OR of these gate signals is taken in an circuit 525 to output them to comparator 522. The gate signals are used as gate signals when an edge of an information magnetic domain is detected in comparator 522, and comparator 522 is designed so as to operate only when the gate signals are open. Incidentally cut-off frequency of low-pass filter 517 is desirably preset to from 1.5 times to 4 times as much as the highest frequency contained in the reproduction signal. It is more desirable to preset it to from 2 times to 3 times.

Figure 7A:
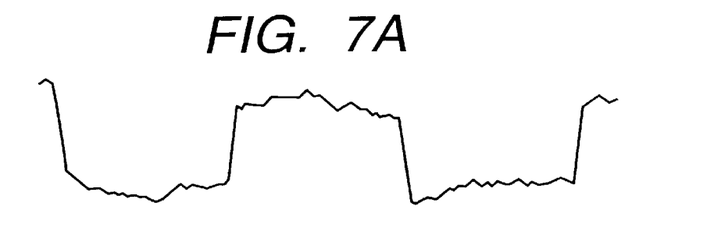
FIGS. 7A, 7B, 7C, 7D and 7E illustrate information reproducing operation according to the second embodiment of the present invention.
Figure 7B:
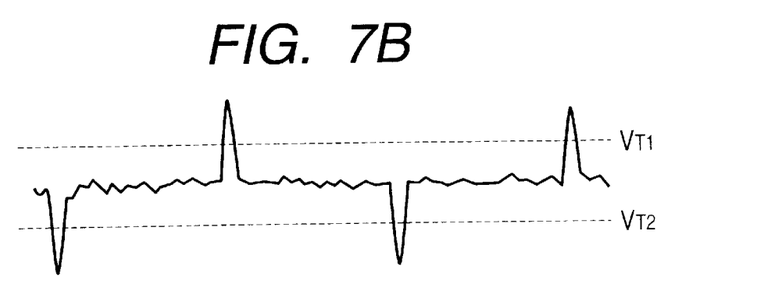

The operation according to this embodiment will hereinafter be described. FIGS. 7A to 7E illustrate signal waveforms indicating the signals of the respective parts in the apparatus in FIG. 6. In this case, a track pitch is narrower than the size of light beam spot 4 for reproduction like FIG. 4A, and crosstalk from an adjacent information track 2 is mixed in the reproduction signal from information track 1, which is steep in rise and fall by domain wall displacement. Accordingly, an S/N ratio in the reproduction signal illustrated in FIG. 7A is poor due to the crosstalk from the adjacent track. FIG. 7B illustrates a primary differential signal from differentiating circuit 518, and FIG. 7C a gate signal generated from the primary differential signal by comparators 523, 524. $V_{T1}$ and $V_{T2}$ indicate threshold values, respectively.

Figure 7C:
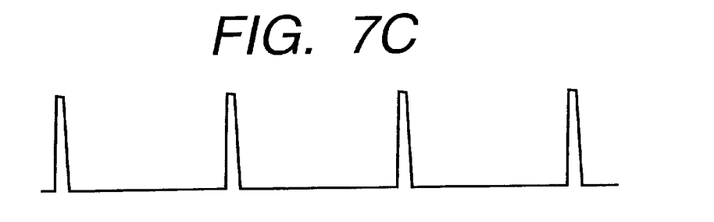
Figure 7D:
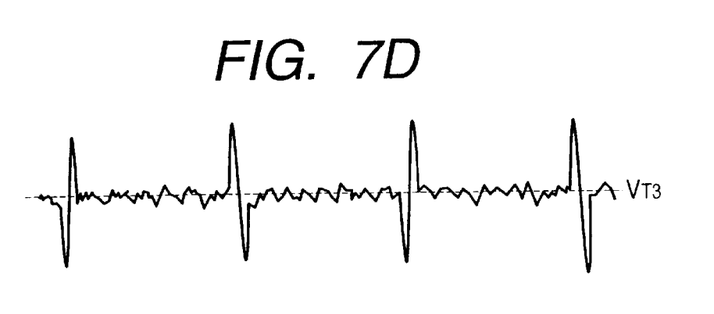
Figure 7E:
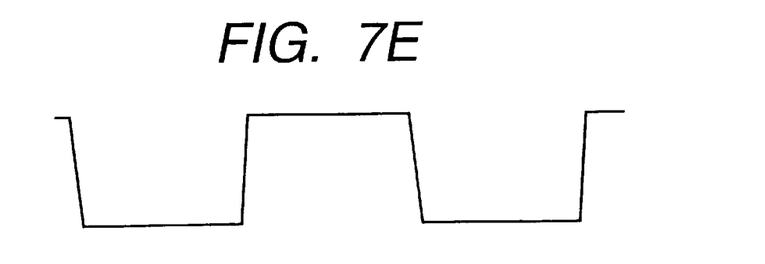

FIG. 7D illustrates a secondary signal generated differentiating circuit 521, and FIG. 7E shows a binary signal generated by detecting the zero-cross point of the secondary signal in comparator 522. As described above, comparator 522 detects the zero-cross point of the secondary signal only when the gate signal in FIG. 7C is open (at a high level). The binary signal illustrated in FIG. 7E can be obtained in such a manner to detect an edge of an information magnetic domain recorded on the information track. The binary signal is used to conduct prescribed signal processing such as demodulation in a reproducing circuit (not illustrated), whereby reproduction data is reproduced.

In this embodiment, the primary differential signal obtained by differentiating the reproduction signal is further differentiated to detect the zero-cross point of the resultant secondary differential signal, thereby detecting an edge of the information magnetic domain. Therefore, the edge of the information magnetic domain can be exactly detected even when the reproduction signal is such a signal deteriorated in S/N ratio due to crosstalk from an adjacent track as illustrated in FIG. 7A, thereby exactly reproducing the recorded information. In addition, comparator 522 is designed so as to operate only when the gate signal obtained from the primary differential signal is open, so that the edge of the information magnetic domain can be exactly detected without being affected by noises and the like.

The present inventors have carried out respective experiments on the above-described first and second embodiments as to the influence of crosstalk from adjacent tracks by making the track pitch of magneto-optical disks narrower than the size of a light beam spot for reproduction to conduct reproduction of information. The experimental results thereof will hereinafter be described.

EXAMPLE 1

First of all, the results in the case of the first embodiment will be described. As the magneto-optical disk 501, was used a disk corresponding to a land-groove substrate having a track pitch of 0.5 μm, which can be applied to the reproducing method utilizing domain wall displacement. With respect to this magneto-optical disk 501, the width of each information track and the width of each separating strip were preset to 0.4 μm and 0.1 μm, respectively. As the optical pickup 502, was used the following optical pickup. Namely, the wavelength of a laser beam from the light source 504 for recording and reproduction was 680 nm and the N.A. of objective lens 507 was 0.55. The size of the light beam spot for reproduction focused on magneto-optical disk 501 from optical pickup 502 was controlled to 1.1 μm in diameter at a position in which the intensity of light was $1/e^2$.

Figure 8:
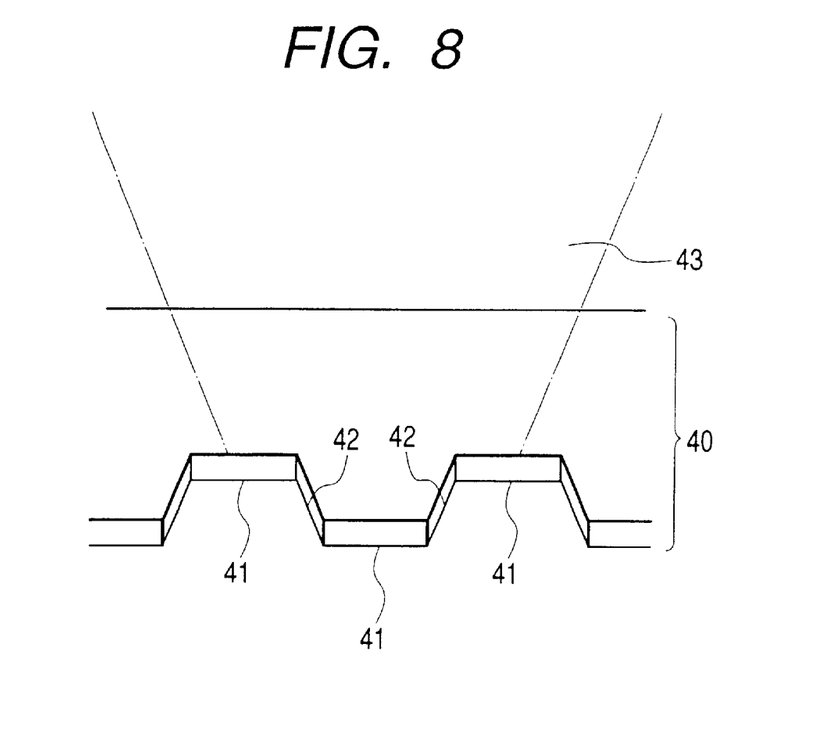
FIG. 8 illustrates the relationship between an information track and a light beam spot for reproduction in EXAMPLE 1 of the present invention.

FIG. 8 illustrates the relationship between an information track and a light beam spot for reproduction in this case. In FIG. 8, reference numeral 40 indicates a magneto-optical disk, 41 an information track, 42 a separating strip, and 43 a light beam spot for reproduction. As apparent from FIG. 8, the size of the light beam spot for reproduction is greater than the track pitch, so that it is difficult due to the influence of crosstalk from adjacent tracks to exactly reproduce information by means of the conventional magneto-optical reproducing apparatus.

A(1,7) RLL-modulated recording magnetic field was then applied to such a magneto-optical disk 501 from a recording magnetic field-generating device 520, and at the same time, the recording film of magneto-optical disk 501 was irradiated with a laser beam for recording through an objective lens 507 from laser source 504 for recording and reproduction, thereby recording information. The rotating velocity of magneto-optical disk 501 was controlled to 1.5 m/s to conduct recording at a data clock of 20 MHz. At this time, the length of the shortest record mark recorded on magneto-optical disk 501 was 0.15 μm. The information recorded in such a manner was reproduced by controlling the laser power of light source 504 for recording and reproduction to a value suitable for reproduction and scanning a laser beam for reproduction on magneto-optical disk 501.

Upon information reproduction, the reflected light from magneto-optical disk 501 was separated into polarized light components of ±45° to the incident light by means of birefringence crystal 513, and they were converted into respective analog signals in RF sensor 515. These two analog signals were differentially amplified by amplifier 516 and then time differentiated in differentiating circuit 518 through low-pass filter 517. As the low-pass filter, was used a four-dimensional Bessel filter. The cut-off frequency was preset to 15 MHz. The signal outputted from differentiating circuit 518 became a signal that a positive pulse and a negative pulse alternately appear respectively according to the leading edge and trailing edge of the analog signal before inputted into differentiating circuit 518 as illustrated in FIG. 4C. This signal outputted from differentiating circuit 518 is binarized by hysteresis comparator 519 to obtain a binary data which becomes 1 at rise of the positive pulse and 0 at fall of the negative pulse as illustrated in FIG. 4D.

Figure 9:
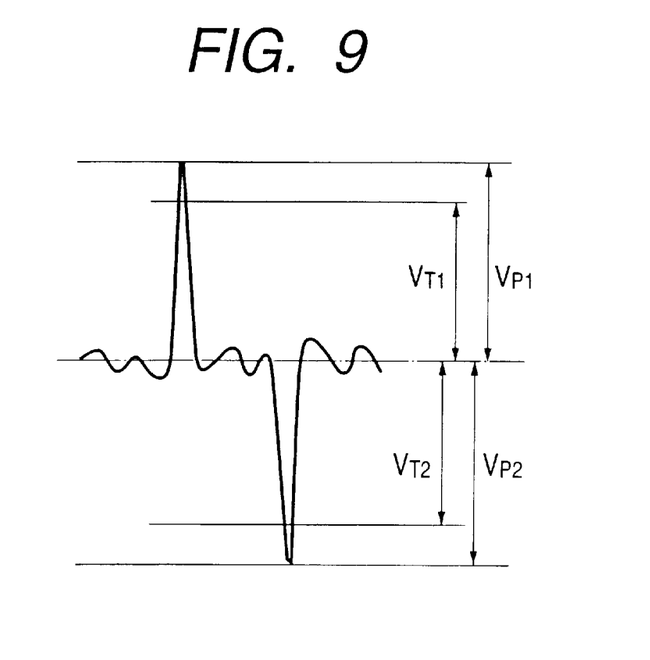
FIG. 9 diagrammatically illustrates the relationship between signal voltage and a threshold value in EXAMPLE 1 of the present invention.

The comparative level of hysteresis comparator 519 was preset to voltage $V_{T1}$ which is 80% of the pulse voltage $V_{P1}$ of the positive pulse for the leading edge of the signal and to voltage $V_{T2}$ which is 80% of the pulse voltage $VP_2$ of the negative pulse for the trailing edge of the signal. FIG. 9 illustrates the relationship among $V_{T1}$, $V_{T2}$, $V_{P1}$ and $VP_2$ in this case. When reproduction experiment was carried out in this manner, such a binary signal free of the influence of crosstalk as illustrated in FIG. 4D was obtained. It was hence confirmed that the information can be exactly reproduced even when the track pitch is fully narrow compared with the spot size of the light beam spot for reproduction.

EXAMPLE 2

Figure 10:
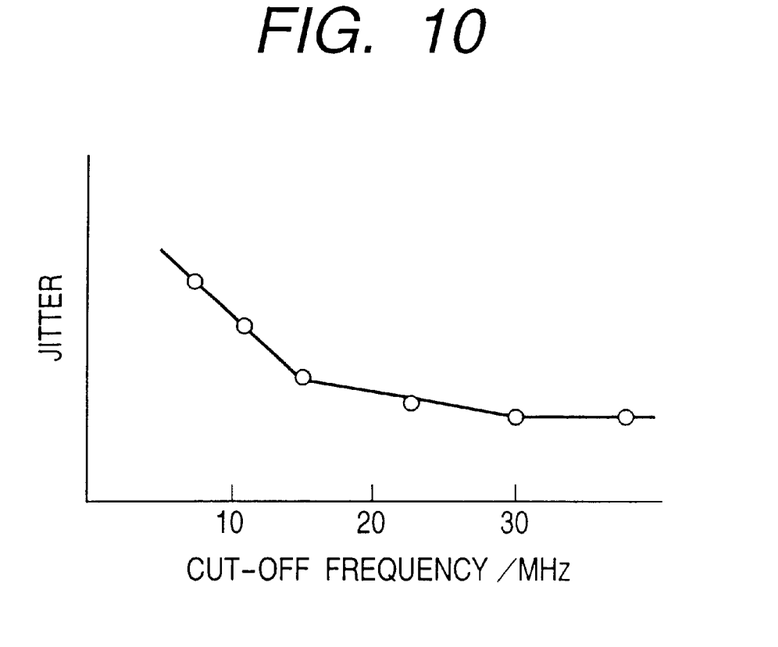
FIG. 10 diagrammatically illustrates the relationship between a cut-off frequency and a jitter in EXAMPLE 2 of the present invention.
Figure 11:
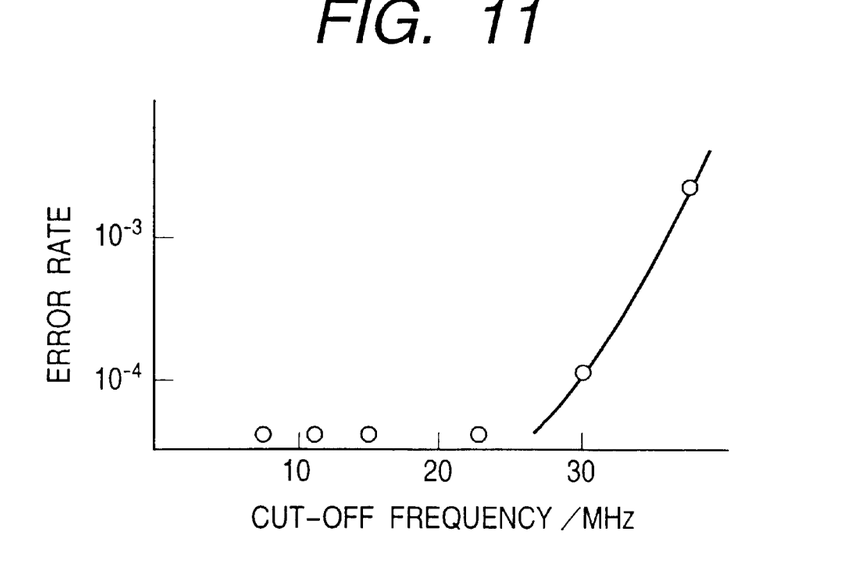
FIG. 11 diagrammatically illustrates the relationship between a cut-off frequency and an error rate in EXAMPLE 2 of the present invention.

A confirmatory experiment was conducted again by changing conditions from the above experiment. A magneto-optical disk 501 and a pickup 502 used were the same as those used in the above experiment. The rotating velocity of magneto-optical disk 501 was preset to 1.5 m/s to record a repeating pattern having a mark length of 0.1 μm. Recording frequency was 7.5 MHz. This signal was reproduced by controlling the laser power of light source 504 for recording and reproduction to a value suitable for reproduction and scanning a laser beam for reproduction on magneto-optical disk 501. The cut-off frequency of the low-pass filter was varied to determine the jitter and error rate of the binary reproduction data. The jitter was determined by measuring a jitter of a pulse width using a time interval analyzer, while the error rate was expressed as a proportion of the number of pulse widths measured beyond the normal distribution by the time interval analyzer. The measured results are illustrated in FIGS. 10 and 11. FIG. 10 diagrammatically illustrates the relationship between the cut-off frequency and the jitter, while FIG. 11 diagrammatically illustrates the relationship between the cut-off frequency and the error rate. As apparent from FIG. 10, the jitter was deteriorated as the cut-off frequency of the low-pass filter was made lower. In particular, when the cut-off frequency was made lower than 15 MHz, i.e., twice as much as the recording frequency, the jitter was markedly deteriorated. When the cut-off frequency was made higher than 30 MHz, i.e., 4 times as much as the recording frequency, deterioration of error rate was observed as illustrated in FIG. 11.

In the information reproducing apparatus for optical disks, the cut-off frequency of the low-pass filter has heretofore been often preset to from a frequency substantially equal to the highest frequency recorded on a recording medium to about twice as much as the highest frequency. This is attributed to the fact that when the cut-off frequency of the low-pass filter is made higher than the highest frequency recorded on the conventional optical disk, the SN ratio of the reproduction signal is deteriorated, and so the jitter is deteriorated. However, as apparent from FIG. 10, it has been found that according to the information reproducing apparatus according to this embodiment, better jitter is yielded as the cut-off frequency of the low-pass filter is made higher. This is considered to be due to the fact that the waveform of the reproduction signal from the recording medium utilizing domain wall displacement exhibits steep leading edge and trailing edge.

EXAMPLE 3

The experimental results in the case of the second embodiment will now be described. As the magneto-optical disk 501, was used a land-groove substrate having a track pitch of 0.45 $\mu$m to produce a magneto-optical disk which can be applied to reproduction utilizing domain wall displacement. With respect to this magneto-optical disk, the width of each information track and the width of each separating strip were preset to 0.35 $\mu$m and 0.1 $\mu$m, respectively. As the optical pickup 502, was used the same optical pickup as that used in EXAMPLE 1. Namely, the wavelength of a laser beam from the light source was 680 nm and the N.A. of the objective lens was 0.55. The size of the light beam spot for reproduction focused on the magneto-optical disk from the optical pickup was controlled to 1.1 $\mu$m in diameter at a position in which the intensity of light was $1/e^2$. In this example, a track pitch relative to the size of light beam spot for reproduction is still narrower than the case in EXAMPLE 1, and so the influence of crosstalk signals from adjacent tracks becomes greater than the case in EXAMPLE 1.

A (1,7) RLL-modulated recording magnetic field was applied to magneto-optical disk 501 from recording magnetic field-generating device 520, and at the same time, the magneto-optical disk 501 was irradiated with a laser beam for recording from optical pickup 502, thereby recording information. The rotating velocity of magneto-optical disk 501 was controlled to 1.5 m/s to conduct recording at a data clock of 20 MHz. At this time, the length of the shortest record mark recorded on magneto-optical disk 501 was 0.15 $\mu$m. The information recorded in such a manner was irradiated with a laser beam for reproduction from optical pickup 502 and reproduced in signal reproducing circuit 503. As the low-pass filter 517 within signal reproducing circuit 503, was used a two-dimensional Bessel filter. The cut-off frequency was preset to 20 MHz.

Upon information reproduction, the reproduction signal outputted from amplifier 516 within signal reproducing circuit 503 is differentiated in differentiating circuit 518 to generate a primary differential signal that a positive pulse and a negative pulse alternately appear respectively according to the leading edge and trailing edge of the reproduction signal as illustrated in FIG. 7B. The thus-obtained primary differential signal is further differentiated in differentiating circuit 521 to generate a secondary differential signal as illustrated in FIG. 7D. A zero-cross point of the secondary differential signal is detected by comparator 522, thereby generating such a binary signal as shown in FIG. 7E. The reproduction was conducted in such a manner. As a result, it was confirmed that the information can be exactly reproduced even when the track pitch is still narrower than the spot size of the light beam spot for reproduction compared with EXAMPLE 1.

The present invention is not limited to the above-described embodiments and can be applied to various changes and modifications. The present invention embraces all these changes and modifications so far as they depart from the scope of the subjected claims.

What is claimed is:

1. A magneto-optical reproducing apparatus for reproducing information recorded on a magneto-optical medium comprising a transparent substrate and a first magnetic layer, a second magnetic layer and a third magnetic layer sequentially laminated on the transparent substrate in that order, where each of the first magnetic layer, the second magnetic layer and the third magnetic layer comprises a magnetic film and has a domain wall coercivity, a domain wall displaceability and a Curie temperature characteristic, and where the first magnetic layer has a smaller domain wall coercivity and greater domain wall displaceability at ambient temperature and temperature close to ambient temperature than the third magnetic layer, and the second magnetic layer has a Curie temperature lower than the first magnetic layer and the third magnetic layer, the apparatus comprising:

an optical system that irradiates the medium with a light beam, where a spot size of the light beam is greater than a pitch of the medium, and where domain walls of a magnetic domain for information formed on the medium are displaced by the irradiation with the light beam;

a photosensor that detects a change in a polarization direction of reflected light of the light beam and outputs a reproduction signal;

a differentiating circuit that differentiates with respect to time the reproduction signal output from the photosensor; and a binarizing circuit that generates a binary signal by comparing the signal differentiated in the differentiating circuit with a prescribed threshold value.

2. The magneto-optical reproducing apparatus according to claim 1, further comprising:

a low pass filter that cuts off a high-frequency region of the reproduction signal and inputs the resultant cut-off signal into the differentiating circuit.

3. The magneto-optical reproducing apparatus according to claim 2, wherein the cut-off frequency of the low-pass filter is within a range of from 1.5 times to 4.0 times as much as a highest modulated frequency in the reproduction signal.

4. The magneto-optical reproducing apparatus according to claim 1, wherein the binarizing circuit compares two different threshold values respectively corresponding to the leading edge and trailing edge of the differential signal with the level of the differential signal to binarize the time differential signal.

5. A magneto-optical reproducing apparatus for reproducing information recorded on a magneto-optical medium comprising a transparent substrate and a first magnetic layer, a second magnetic layer and a third magnetic layer sequentially laminated on the transparent substrate in that order, where each of the first magnetic layer, the second magnetic layer and the third magnetic layer comprises a magnetic film and has a domain wall coercivity, a domain wall displaceability and a Curie temperature characteristic, and where the first magnetic layer has a smaller domain wall coercivity and greater domain wall displaceability at ambient temperature and temperature close to ambient temperature than the third magnetic layer, and the second magnetic layer has a Curie temperature lower than the first magnetic layer and the third magnetic layer, the apparatus comprising:

an optical system that irradiates the medium with a light beam, where a spot size of the light beam is greater than a pitch of the medium, and where domain walls of a magnetic domain for information formed on the medium are displaced by the irradiation with the light beam;

a photosensor that detects a change in a polarization direction of reflected light of the light beam and outputs a reproduction signal;

a first differentiating circuit that differentiates with respect to time the reproduction signal output from the photosensor to generate a primary time differential signal;

a second differentiating circuit that differentiates with respect to time the primary time differential signal to generate a secondary time differential signal; and a binarizing circuit that generates a binary signal by comparing the secondary time differential signal generated in the second differentiating circuit with a prescribed threshold value.

6. The magneto-optical reproducing apparatus according to claim 5, further comprising:

a gate signal generating circuit that generates a gate signal from the primary time differential signal, and wherein the binarizing circuit performs binarization of the secondary time differential signal only when the gate signal is in an open state.

7. The magneto-optical reproducing apparatus according to claim 5, further comprising:

a low-pass filter that cuts off a high-frequency region of the reproduction signal and inputs the resultant cut-off signal into the first differentiating circuit.

8. The magneto-optical reproducing apparatus according to claim 7, wherein the cut-off frequency of the low-pass filter is within a range of from 1.5 times to 4.0 times as much as a highest modulated frequency in the reproduction signal.

9. The magneto-optical reproducing apparatus according to claim 1, wherein the spot size is not less than twice the track pitch.

10. The magneto-optical reproducing apparatus according to claim 5, wherein the spot size is not less than twice the track pitch.

* * * * *

UNITED STATES PATENT AND TRADEMARK OFFICE
CERTIFICATE OF CORRECTION

PATENT NO.    : 6,424,602 B1
DATED         : July 23, 2002
INVENTOR(S)   : Eiichi Fujii It is certified that error appears in the above-identified patent and that said Letters Patent is hereby corrected as shown below:

<u>Column 1,</u>
Line 37, "devises" should read -- devices --.

<u>Column 4,</u>
Line 12, "other" should read -- another --.

<u>Column 5,</u>
Line 43, "multia-layer" should read -- multi-layer --.

<u>Column 6,</u>
Line 5, "act" should read -- acts --.
Line 43, "an d" should read -- and --.
Line 44, "broken ," should read -- broken, --.

<u>Column 7,</u>
Line 52, "serve" should read -- servo --.

<u>Column 9,</u>
Line 42, "that" should read -- where --.

<u>Column 10,</u>
Line 34, "an" should read -- a --.

<u>Column 12,</u>
Line 6, "was used" should be deleted.
Line 7, "filter." should read -- filter was used. --.
Line 12, "inputted" should read -- being input --.
Line 27, "narrow" should read -- narrowly --.

UNITED STATES PATENT AND TRADEMARK OFFICE
CERTIFICATE OF CORRECTION

PATENT NO.     : 6,424,602 B1
DATED          : July 23, 2002
INVENTOR(S)    : Eiichi Fujii It is certified that error appears in the above-identified patent and that said Letters Patent is hereby corrected as shown below:

<u>Column 13,</u>
Line 14, "was used a land-groove substrate" should read -- a land-groove substrate was used, --.
Line 20, "was used" should be deleted.
Line 21, "EXAMPLE 1." should read -- EXAMPLE 1 was used. --.
Line 45, "was used a two-dimensional Bessel filter." should read -- a two-dimensional Bessel filter was used. --.

Signed and Sealed this

Fourteenth Day of January, 2003

JAMES E. ROGAN
*Director of the United States Patent and Trademark Office*